United States Patent
Fievre

(10) Patent No.: US 7,145,973 B2
(45) Date of Patent: Dec. 5, 2006

(54) RECEIVER AND METHOD OF RECEPTION WITH LOW SENSITIVITY TO FADING

(75) Inventor: Bruno Fievre, Nantes (FR)

(73) Assignee: Thales, Paris (FR)

( * ) Notice: Subject to any disclaimer, the term of this patent is extended or adjusted under 35 U.S.C. 154(b) by 752 days.

(21) Appl. No.: 10/348,331

(22) Filed: Jan. 22, 2003

(65) Prior Publication Data
US 2004/0001050 A1     Jan. 1, 2004

(30) Foreign Application Priority Data
Jan. 22, 2002  (FR) .................................. 02 00765

(51) Int. Cl.
*H04L 7/02*    (2006.01)
*H04L 7/06*    (2006.01)

(52) U.S. Cl. .................... 375/360; 375/364; 375/365

(58) Field of Classification Search ................ 375/354, 375/355, 359–366
See application file for complete search history.

(56) References Cited

U.S. PATENT DOCUMENTS

| | | | |
|---|---|---|---|
| 4,029,900 A | 6/1977 | Addeo | |
| 4,768,032 A | 8/1988 | McPherson et al. | |
| 5,446,765 A * | 8/1995 | Leger | 375/359 |
| 6,178,214 B1 * | 1/2001 | Nagashima | 375/364 |
| 2004/0057542 A1 * | 3/2004 | Knapp et al. | 375/355 |
| 2005/0060052 A1 * | 3/2005 | Fuller | 700/94 |
| 2005/0105662 A1 * | 5/2005 | Margules | 375/376 |

FOREIGN PATENT DOCUMENTS

FR       0 568 856 A     11/1993

* cited by examiner

*Primary Examiner*—Don N. Vo
(74) *Attorney, Agent, or Firm*—Lowe Hauptman & Berner, LLP

(57) ABSTRACT

A method for the reception of a signal comprising the following steps: 1) on the detection or reception of an edge in the received signal, a counting cycle Nc is activated, 2) when the value of Nc is equal to a number M of beeps of a generation clock Hg, a leading edge of the reception clock signal is sent and a new counting cycle Nc is activated, 3) when this new value of Nc is equal to a number M of beeps of a generation clock Hg, the clock Hr is made to pass to zero, and simultaneously 3.1) in the event of reception of an edge in the received signal, a new clock signal edge is sent when Nc=M, 3.2) in the event of non-reception in the received signal, a new clock signal edge offset by a value of 1(M+1) is sent when Nc=M, 4) the steps 1) and 2) are executed so long as the header is not detected, 5) upon the detection of a header, a Header Found signal is sent, the steps 1), 2), 3) and 3.1) are executed and this Header Found signal is transmitted at a processing step.

11 Claims, 3 Drawing Sheets

TRANSMISSION DATA FRAME

| SYNCHRONIZATION BITS Part I | MESSAGE HEADER Part II | MESSAGE Part III |
|---|---|---|

RECEIVER AND METHOD OF RECEPTION WITH LOW SENSITIVITY TO FADING

BACKGROUND OF THE INVENTION

1. Field of the Invention

The present invention relates especially to a signal receiver and a method of reception that has very low sensitivity or is even insensitive to fading (namely the absence of signal transmission).

It also relates to all demodulators that tend to get desynchronized when fading occurs on the radio channel especially in the high frequency (HF) domain.

It can also be applied in all data transmission devices that use synchronization and are liable to lose information, especially in the field of radio communications.

2. Description of the Prior Art

Demodulators, especially in the HF domain, generally use synchronization bits to decode messages. These synchronization bits correspond to the generation of a clock signal from the received data signal. When there is fading in the radio channel (namely the absence of transmission during a message), the demodulator gets desynchronized. This causes a shift in the bits received, leading to an irremediable loss of the data received after fading.

To overcome this drawback, the techniques commonly used in the prior art consist, for example, of the total or partial re-transmission of the lost messages, or again of the transmission of the same message on several radio channels in order to increase the probability of good data reception.

SUMMARY OF THE INVENTION

The invention relates to a method for the reception of a signal comprising one or more messages having a structure formed by at least one synchronization block (part I), followed by a header (part II) and a data block to be transmitted (part III). The method makes use of a transmission frequency given for example by a transmission clock and a reception frequency coming from a reception clock for example. The method comprises at least the following steps:

Synchronization
1) on the detection or reception of an edge in the received signal, a counting cycle Nc is activated,
2) when the value of Nc is equal to a number M of beeps of a generation clock Hg, a leading edge of the reception clock signal is emitted and a new counting cycle Nc is activated,
3) when this new value of Nc (obtained at the step 2) is equal to a number M of beeps of a generation clock Hg, the clock Hr is made to pass to zero, and simultaneously
   3.1) in the event of reception of an edge in the received signal, the counter Nc starts counting M strokes before sending a new clock signal edge,
   3.2) in the event of non-reception in the received signal, the counter Nc start counting M+1 strokes before sending a new clock signal edge offset by a value of 1/(M+1)
4) the steps 1) and 2) are executed so long as the header is not detected, Recognition of the header
5) upon the detection of a header (last bit of the header received), a Header Found signal is sent, the steps 1), 2), 3) and 3.1) are executed and the Header Found signal is transmitted at a processing step.

The frequency of the reception clock signal Hg may be equal to N times the data transmission frequency, the number M may be equal to N/2 and the number N may be equal to 16 or 64. N is preferably equal to 16 and M to 8.

The method and the device according to the invention have the advantage especially of overcoming the problem of loss of synchronization in a simple way without bringing into question the standard methods of clock signal generation, as well as the architectures of modems, demodulators or modulation and demodulation devices.

BRIEF DESCRIPTION OF THE DRAWINGS

Other features and advantages of the invention shall appear more clearly from the following description, given by way of an illustration that in no way restricts the scope of the invention, with reference to the appended figures, of which.

MORE DETAILED DESCRIPTION

In order to provide for a clearer understanding of the principle used in the method according to the invention, the following description is given by way of an illustration that in no way restricts the scope of the invention for a demodulator used in the HF domain. Without departing from the context of the invention, it can also be applied to all demodulators or to all modulation-demodulation devices or again to any device in which the decoding of the data received makes use of synchronization.

Before describing the object of the present invention, some data useful for its understanding is recalled.

Figures 1, 2:
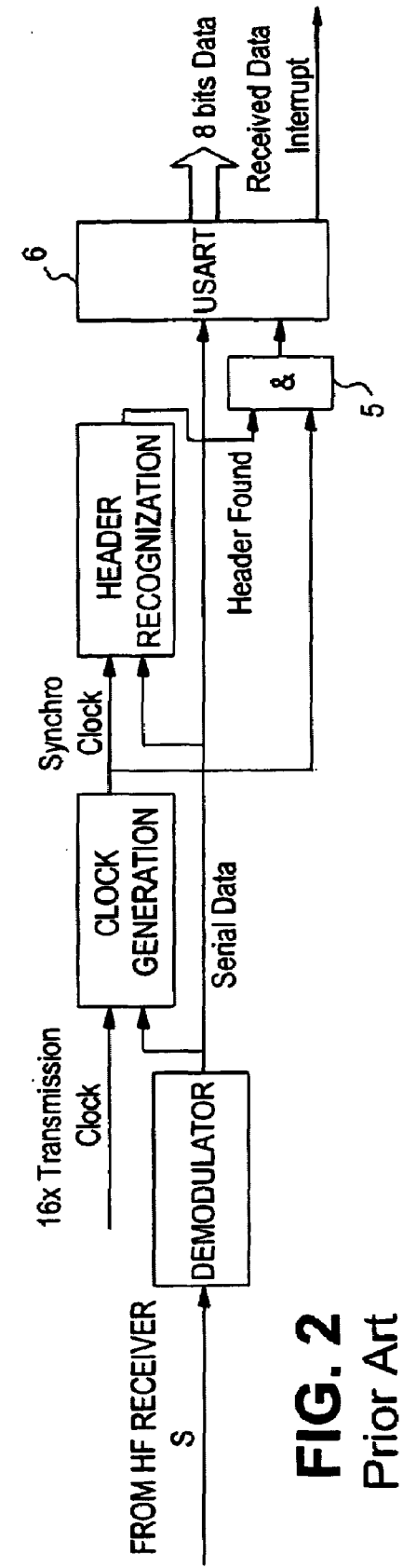
FIG. 1 shows the structure of a message received by the demodulator.
FIG. 2 is a block diagram of a reception chain according to the prior art.

FIG. 1 shows an exemplary structure of a message exchanged by radio. It has three distinct parts:

Part I comprises several synchronization bits formed by a sequence of 0s and 1s (0, 1, 0, 1, 0, etc.) of variable duration, used especially to calibrate the reception chain, especially the demodulator, Part II is formed by a message "header" consisting of a predefined sequence used to recognize the reception of a message in the stream of information coming from the demodulator, Part III is the body of the message proper, comprising the useful data.

The receiver receives a signal which, as a general rule, consists either of noise (a random sequence of 0s and 1s), or a message having a structure such as the one described in FIG. 1. According to the prior art, the reception chain comprises for example a demodulator 2, a clock signal generation circuit 3 and all the other elements needed for the reception and decoding of the received signals, these elements being known to those skilled in the art. The clock signal generation circuit 3 has the function especially of preparing a clock signal synchronized with each of the bits received, or a reception clock signal Hr. The synchronization is done, for example, from the first edge of each bit of the signal received. The reception clock signal is used to introduce the data received into the message header recognition circuits (4) and then (for the body of the message) into the data parallelization circuit (USART6). This circuit has the function of parallelizing information received serially according to a rhythm that corresponds to the predetermined (transmission) clock signal value.

The reception clock signal Hr is generated for example from a fixed clock signal Hg having a frequency Fg *N times greater than the data transmission frequency Ft. The value N is equal for example to 16 or 64 values classically chosen in the UARTs. The clock signal is synchronized at the reception of each bit so that the clock signal is in phase with it. The synchronization is done in terms of plus or minus, by steps equal to 1/Nth of the reception frequency starting from the edge of the bit received, for example 1/16th.

This technique however has the drawback of being sensitive to fading, leading to a loss of received data. Indeed, since the synchronization is done upon reception of the edge of a bit, if there is an excessively great duration of fading, then a desynchronization is observed. This desynchronization is expressed for example by an excess (supplementary) clock signal beep which affects the entire end of the message. For example, this occurs when the duration of this fading is greater than the duration of reception of 8 successive bits or after a prefixed number M of bits.

Figure 3:
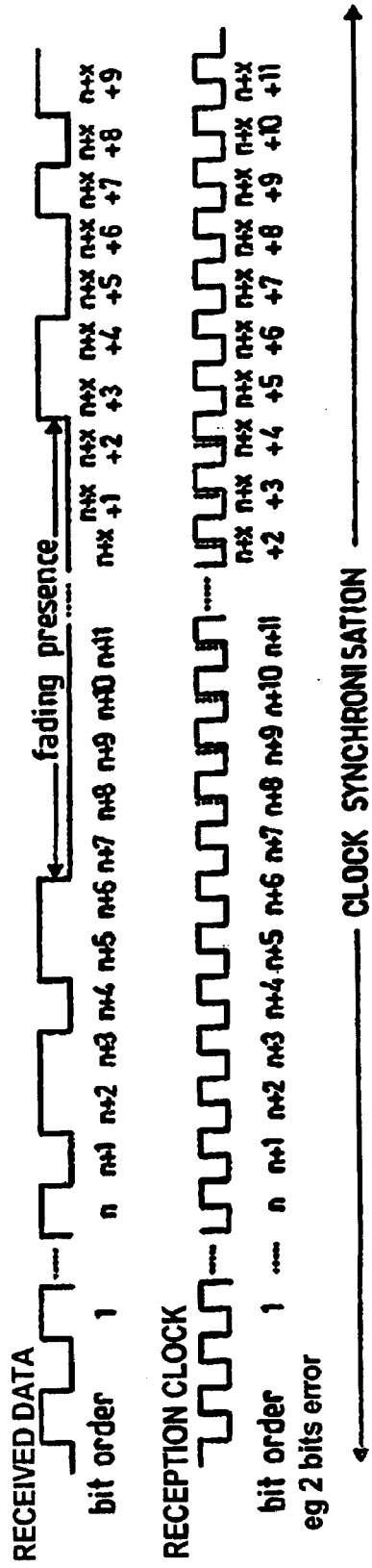
FIG. 3 is a timing diagram describing the problem of a two-bit desynchnronization in a prior art modem.

This phenomenon is shown in FIG. 3 which gives a diagrammatic view of a timing diagram describing a two-bit shift at the reception of the message (fading of two times 8 bits for a clock signal Fg with a frequency 16 times greater than the transmission frequency Ft).

The idea of the present invention consists especially in breaking down the reception of a message into two parts: firstly, the permanent clock signal synchronization in the noise, during the reception of the synchronization bits and the header, and secondly the stopping of the clock synchronization as soon as the header of the message is recognized.

Figure 4:
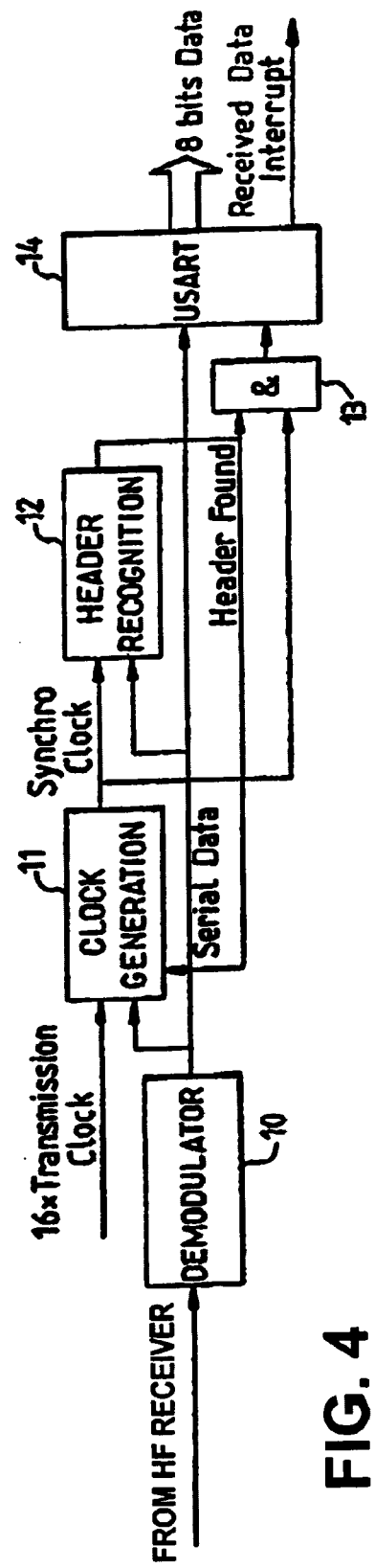
FIG. 4 is a block diagram of an exemplary reception chain according to the invention.

FIG. 4 is an exemplary block diagram of the reception chain integrated for example into a demodulation device used in the HF domain.

The signals S received by the receiver 1 are transmitted to the demodulator 10. At output of this demodulator, the signal takes the form of bits 0 and 1 forming the signal S1. This signal S1 generally consists of noise or a message with a structure such as the one given in FIG. 1 for example. The signal S1 is transmitted to a clock signal generation circuit 11, the header recognition circuit 12 and also the USART 14 for example in the form of serial data.

The clock signal generation circuit 11 also receives a clock signal Hg whose frequency Fg is equal for example to 16 times the transmission frequency Ft used to transmit the data.

This clock signal generation circuit 11 may be made in hardware or software form depending on the clock signal values. This circuit comprises, inter alia, a counter Nc known to those skilled in the art and used during the generation of a synchronization clock signal Hr or reception clock signal by using especially the clock signal Hg. The clock signal generation device also comprises a device for the detection of the synchronization bits.

The demodulator also comprises a means to recognize the header of the message which takes hardware or software form. The choice between these two variants is a function for example of the frequency of the information.

The steps executed by the method are described by way of an illustration and in a wholly non-restrictive way in the case where the detection is made on the synchronization bits of the message.

Synchronization Steps

1) Upon reception of an edge of a received bit (at output of the demodulation circuit), an appropriate device known to those skilled in the art sends this information to the counter Nc which then activates a counting cycle.

2) When the value Nc of the counter is equal for example to M=8 clock strokes (for a clock signal whose frequency is 16 times greater than that of the transmission clock signal), the clock signal generation circuit emits a leading edge of the reception clock signal Hr (clock signal synchronized with the received bits). The corresponding frequency Fr is then equal to the transmission frequency Ft. The clock signal edge Hr coincides for example substantially with the middle of a bit (the middle of the temporal square wave signal corresponding to a 0 or a 1 for example). The counter Nc is for example reset and starts a new counting cycle, 3) at the end of 8 clock strokes for example, (the new value of Nc is counted from the activation of the new counting cycle and is equal to 8), the circuit makes the clock signal Hr pass to 0 and it ascertains that it has received an edge corresponding to the end of the bit transmitted; it resets the value of the counter Nc at 0 (resetting)

3.1) in the event of the reception of an edge (in the signal received at the output of the demodulation circuit), the counter starts again counting M+1=8 strokes, before generating a new clock signal edge Hr.

3.2) in the case of non-reception of an edge, the circuit automatically generates a clock signal edge offset by 1/16 (counting of M=8 clock strokes+one); this edge temporally takes the form of a square wave with a variable duration since it is linked in a control loop with the temporal variability of the bit received. The time shift of the clock signal edge cannot exceed 1/16 of a clock signal.

Recognition of the Header

The steps 1) to 2) are performed so long as the detection circuit has not recognized the header.

Figure 5:
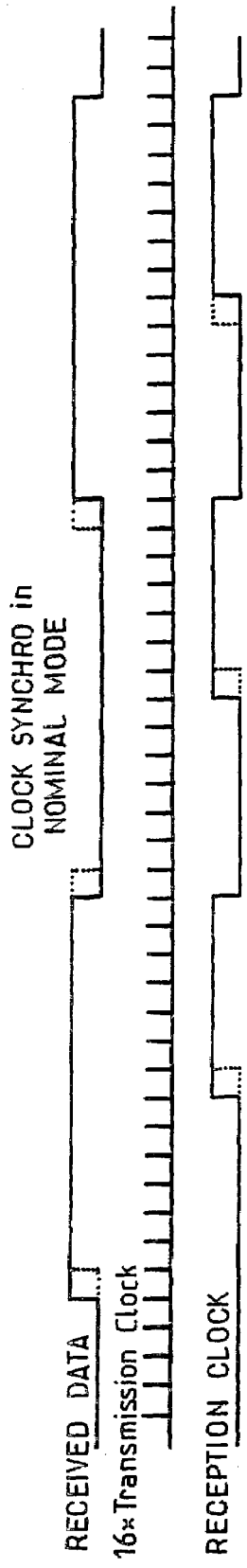
FIG. 5 is a timing diagram showing the generation of a reception clock signal according to the invention, FIG. 6 show the clock synchronization/desynchronization phases.
Figure 6:
Figure 7:
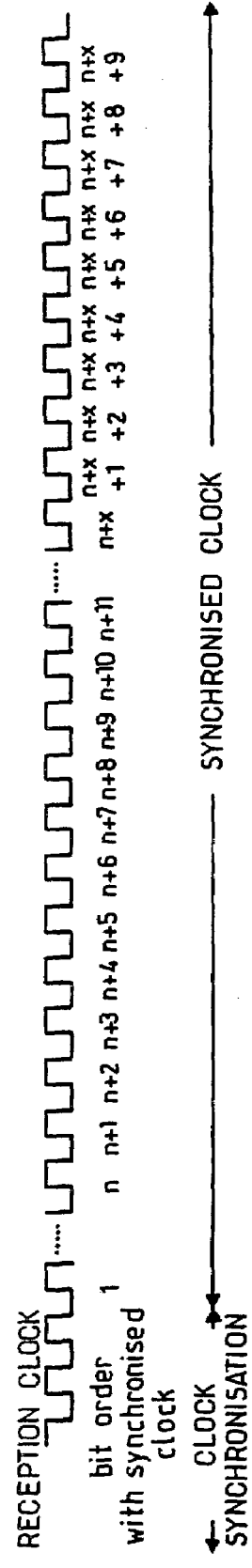
FIG. 7 is a timing diagram giving a diagrammatic view of the result of the insensitivity to fading.

4) After the recognition of the header of the message $S_1$, the method:

4.1) emits a Header Found signal ($S_{HF}$) from the header recognition circuit to the clock signal generation circuit in order to stop the above-mentioned synchronization steps (in the step 3.2, the counter is limited to M=8 clock strokes). At this moment, it is assumed in the method that the reception clock signal is synchronized (the header having been received, the reception chain is considered to work accurately); this is especially shown in FIG. 5. The synchronization steps 1), 2), 3) and 3.1) are continued.

4.2) this signal ($S_{HF}$) is transmitted to a logic "AND" type circuit 13 which also receives the generated reception clock signal Hr, used as the basis for the data decoding. The "AND" circuit enables the reception clock signal Hr to pass to the USART 14 whose function defined here above is to parallelize the data received at the frequency of the reception clock signal.

Generation of the Signal

The USART thus generates a signal in the form of eight-bit words for example and all the other signals usually generated.

Advantageously, the steps of the method according to the invention offer the possibility of generating a clock signal without discontinuity even in the presence of fading or when there is no signal.

What is claimed is:

1. A method for the reception of a signal comprising one or more messages having a structure formed by at least one synchronization block (part I), followed by a header (part II) and a data block to be transmitted (part Ill), the method making use of a transmission clock frequency and a reception clock frequency characterized in that the method comprises the following steps:

Synchronization 1) on the detection or reception of an edge in the received signal, a counting cycle Nc is activated, 2) when the value of Nc is equal to a number M of beeps of a generation clock Hg, a leading edge of the reception clock signal is emitted and a new counting cycle Nc is activated, 3) when this new value of Nc (obtained at the step 2) is equal to a number M of beeps of a generation clock Hg, a clock Hr is made to pass to zero, and simultaneously 3.1) in the event of reception of an edge in the received signal, a counter Nc starts counting M strokes before sending a new clock signal edge, 3.2) in the event of non-reception in the received signal, the counter Nc start counting M+1 strokes before sending a new clock signal edge offset by a value of 1/(M+1)4) the steps 1) and 2) are executed so long as the header is not detected, Recognition of the header 5) upon the detection of a header, a Header Found signal is sent, the steps 1), 2), 3) and 3.1) are executed and the Header Found signal is transmitted at a processing step.

2. The method according to claim 1 wherein the frequency of a reception clock signal Hg is equal to N times a data transmission frequency and the number M is equal to N/2.

3. The method according to claim 2 wherein the number N is equal to 16 or 64, and M is equal to 8.

4. The receiver that has low sensitivity or is insensitive to fading, comprising at least one demodulator, one clock signal generation circuit, one message header recognition circuit, one USART, wherein the receiver comprises a device adapted to implementing the steps described according to claim 3 of the method.

5. The method of claim 2 wherein the number M is equal to 16.

6. The receiver that has low sensitivity or is insensitive to fading, comprising at least one demodulator, one clock signal generation circuit, one message header recognition circuit, one USART, wherein the receiver comprises a device adapted to implementing the steps described according to claim 2 of the method.

7. The method according to claim 1 wherein the value Nc is reset at zero during the sending of the leading edge of the reception clock signal.

8. The receiver that has low sensitivity or is insensitive to fading, comprising at least one demodulator, one clock signal generation circuit, one message header recognition circuit, one USART, wherein the receiver comprises a device adapted to implementing the steps described according to claim 7 of the method.

9. The method according to claim 1 wherein the signal processing step comprises the following steps: transmitting the Header Found signal and a reception clock signal Hr to a logic "AND" circuit in order to activate the parallelization of the data received at the frequency of the reception clock signal.

10. The receiver that has low sensitivity or is insensitive to fading, comprising at least one demodulator, one clock signal generation circuit, one message header recognition circuit, one USART, wherein the receiver comprises a device adapted to implementing the steps described according to claim 9 of the method.

11. The receiver that has low sensitivity or is insensitive to fading, comprising at least one demodulator, one clock signal generation circuit, one message header recognition circuit, one USART, wherein the receiver comprises a device adapted to implementing the steps described according to claim 1 of the method.

* * * * *